(12) United States Patent
von Kries

(10) Patent No.: US 9,575,222 B2
(45) Date of Patent: Feb. 21, 2017

(54) RIGID DEFORMABLE REFLECTORS AND METHODS OF MANUFACTURING THEREOF

(71) Applicant: Karl von Kries, Pismo Beach, CA (US)

(72) Inventor: Karl von Kries, Pismo Beach, CA (US)

(*) Notice: Subject to any disclaimer, the term of this patent is extended or adjusted under 35 U.S.C. 154(b) by 0 days.

(21) Appl. No.: 14/307,156

(22) Filed: Jun. 17, 2014

(65) Prior Publication Data

US 2014/0293466 A1    Oct. 2, 2014

Related U.S. Application Data

(63) Continuation of application No. 13/773,510, filed on Feb. 21, 2013, now abandoned.

(60) Provisional application No. 61/601,513, filed on Feb. 21, 2012.

(51) Int. Cl.

| | |
|---|---|
| *G02B 5/08* | (2006.01) |
| *F24J 2/02* | (2006.01) |
| *F24J 2/06* | (2006.01) |
| *F24J 2/07* | (2006.01) |
| *B29D 11/00* | (2006.01) |
| *F24J 2/10* | (2006.01) |
| *F24J 2/38* | (2014.01) |
| *F24J 2/40* | (2006.01) |
| *F24J 2/46* | (2006.01) |

(52) U.S. Cl.
CPC ............ *G02B 5/08* (2013.01); *B29D 11/00596* (2013.01); *F24J 2/02* (2013.01); *F24J 2/067* (2013.01); *F24J 2/07* (2013.01); *F24J 2/1052* (2013.01); *F24J 2/38* (2013.01); *F24J 2/40* (2013.01); *F24J 2/4638* (2013.01); *Y02B 40/18* (2013.01); *Y02E 10/41* (2013.01); *Y02E 10/47* (2013.01)

(58) Field of Classification Search
CPC ........... G02B 26/0825; G02B 5/08; F24J 2/02; F24J 2/1052; F24J 2/145; F24J 2/067; F24J 2/07; F24J 2/38; F24J 2/4638; F24J 2/40; B29D 11/00596; Y02B 40/18; Y02E 10/41; Y02E 10/47
USPC .......................... 126/697, 699, 681; 359/847
See application file for complete search history.

(56) References Cited

U.S. PATENT DOCUMENTS

| | | | | |
|---|---|---|---|---|
| 4,033,676 | A | * | 7/1977 | Brantley et al. .............. 359/847 |
| 4,352,112 | A | * | 9/1982 | Leonhardt et al. ........... 343/915 |
| 2012/0104658 | A1 | * | 5/2012 | von Kries ................. F24J 2/38 264/402 |

* cited by examiner

*Primary Examiner* — Alfred Basichas
(74) *Attorney, Agent, or Firm* — The Law Offices of Eric W. Peterson

(57) ABSTRACT

A rigid deformable reflector for heating a target, the rigid deformable reflector having a reflective surface capable of being rigidly deformed, a backing surface capable of supporting the reflective surface, and a concave shape. A method of deforming a rigid deformable reflector utilizing a deforming mechanism, wherein the rigid deformable reflector has a reflective surface and the deforming mechanism has a base and an actuator, the method having the steps of: placing a rigid deformable reflector onto the deforming mechanism, and activating the actuator thereby causing a first force to be applied to the rigid deformable reflector and deforming the shape of the rigid deformable reflector beyond its elastic limit.

22 Claims, 13 Drawing Sheets

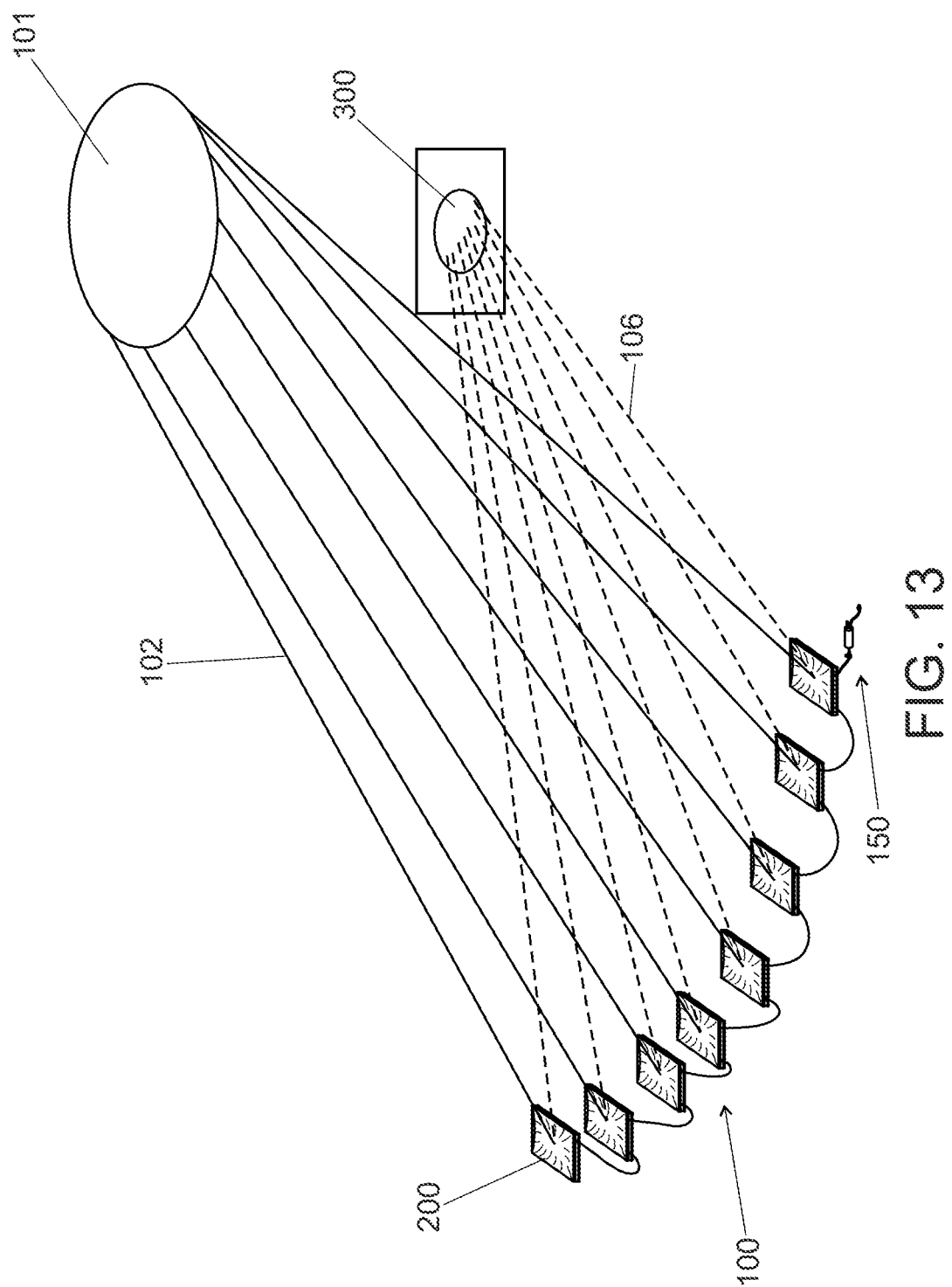

RIGID DEFORMABLE REFLECTORS AND METHODS OF MANUFACTURING THEREOF

CROSS-REFERENCE TO RELATED APPLICATION

This application is a continuation application that claims the benefit of U.S. patent application Ser. No. 13/773,510, filed on Feb. 21, 2013, which claims the benefit of U.S. Provisional Application No. 61/601,513, filed on Feb. 21, 2012, both of which are incorporated herein by reference in their entirety.

BACKGROUND

Manufacturing processes for plastic products typically include heating various forms of plastic (e.g., pellets, powders, sheets, etc.) and forming the plastic into the desired shape. Reflectors can be incorporated into heliostats and used to reflect radiant solar energy toward a target to heat plastic. Reflectors can be deformed to a concave or convex shape depending on the desired focal point of the reflector. It is important to avoid defects in deformed reflectors to increase the focus of the focal point and maximize the amount of radiant solar energy reflected toward the target.

SUMMARY OF THE INVENTION

The present disclosure pertains to a rigid deformable reflector for heating a target, the rigid deformable reflector has a reflective surface capable of being rigidly deformed. In one aspect of the disclosure, the reflective surface has a layered composite. In another aspect of the disclosure, the rigid deformable reflector further has a backing surface, said backing surface capable of supporting the reflective surface, wherein the backing surface engages the reflective surface. In another aspect of the disclosure, the rigid deformable reflector has a convex shape. In another aspect of the disclosure, the rigid deformable reflector has a concave shape. In another aspect of the disclosure, the concave shape is capable of providing a focal point.

Another aspect of the disclosure is a reflector deforming system for deforming a rigid deformable reflector having: a rigid deformable reflector, and a deforming mechanism capable of deforming a backing surface. In another aspect of the disclosure, the deforming mechanism has a base and an actuator, whereby the base engages the backing surface, the engagement of the base with the backing surface defines a chamber, and the actuator is capable of applying a force to the rigid deformable reflector. In another aspect of the disclosure, the deforming mechanism further has a gasket capable of creating an air tight seal between the backing surface and the base. In another aspect of the disclosure, the deforming mechanism further has a sealing material capable of preventing air from passing between the interior or the chamber and the exterior of the chamber. In another aspect of the disclosure, the actuator is a pneumatic actuator. In another aspect of the disclosure, the actuator has a passageway, inlet, and pressure source. In another aspect of the disclosure, the actuator further has a pressure release valve. In another aspect of the disclosure, the deforming mechanism is capable of deforming a backing surface to a convex shape. In another aspect of the disclosure, the deforming mechanism is capable of deforming a backing surface to a concave shape. In another aspect of the disclosure, the concave shape is capable of providing a focal point.

Another aspect of the disclosure is a method of deforming a rigid deformable reflector utilizing a deforming mechanism, wherein the rigid deformable reflector has a reflective surface and the deforming mechanism has a base and an actuator, the method having the steps of: placing a rigid deformable reflector onto the deforming mechanism, and activating the actuator thereby causing a first force to be applied to the rigid deformable reflector and deforming the shape of the rigid deformable reflector. In another aspect of the disclosure, the force applied to the rigid deformable reflector causes the rigid deformable reflector to be deformed beyond its elastic limit. In another aspect of the disclosure, the deformed shape of the rigid deformable reflector is a convex shape. In another aspect of the disclosure, the deformed shape of the rigid deformable reflector is a concave shape. In another aspect of the disclosure, the concave shape is capable of providing a focal point. In another aspect of the disclosure, the method has the step of deactivating the actuator releasing the force applied to the rigid deformable reflector. In another aspect of the disclosure, where the deforming mechanism has a pressure release valve, the method further has the step of opening the pressure release valve. In another aspect of the disclosure, the method has the step of actuating the actuator thereby causing a second deforming force to be applied to the rigid deformable reflector in the opposite direction as the first deforming force, thereby deforming the shape of the rigid deformable reflector.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 13 is a perspective view of a deforming system according to an exemplary embodiment.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Figure 1:
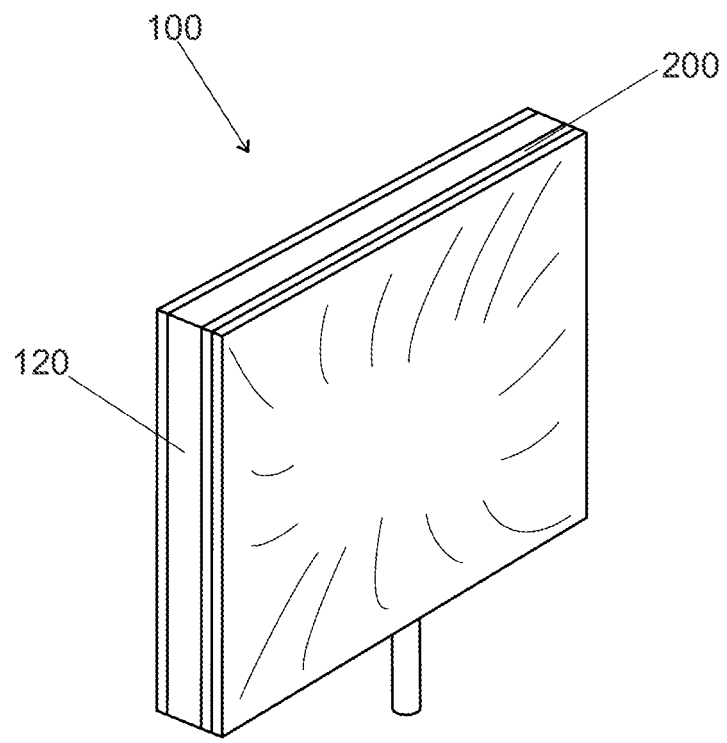
FIG. 1 is a perspective view of a deforming system according to an exemplary embodiment.
Figure 2:
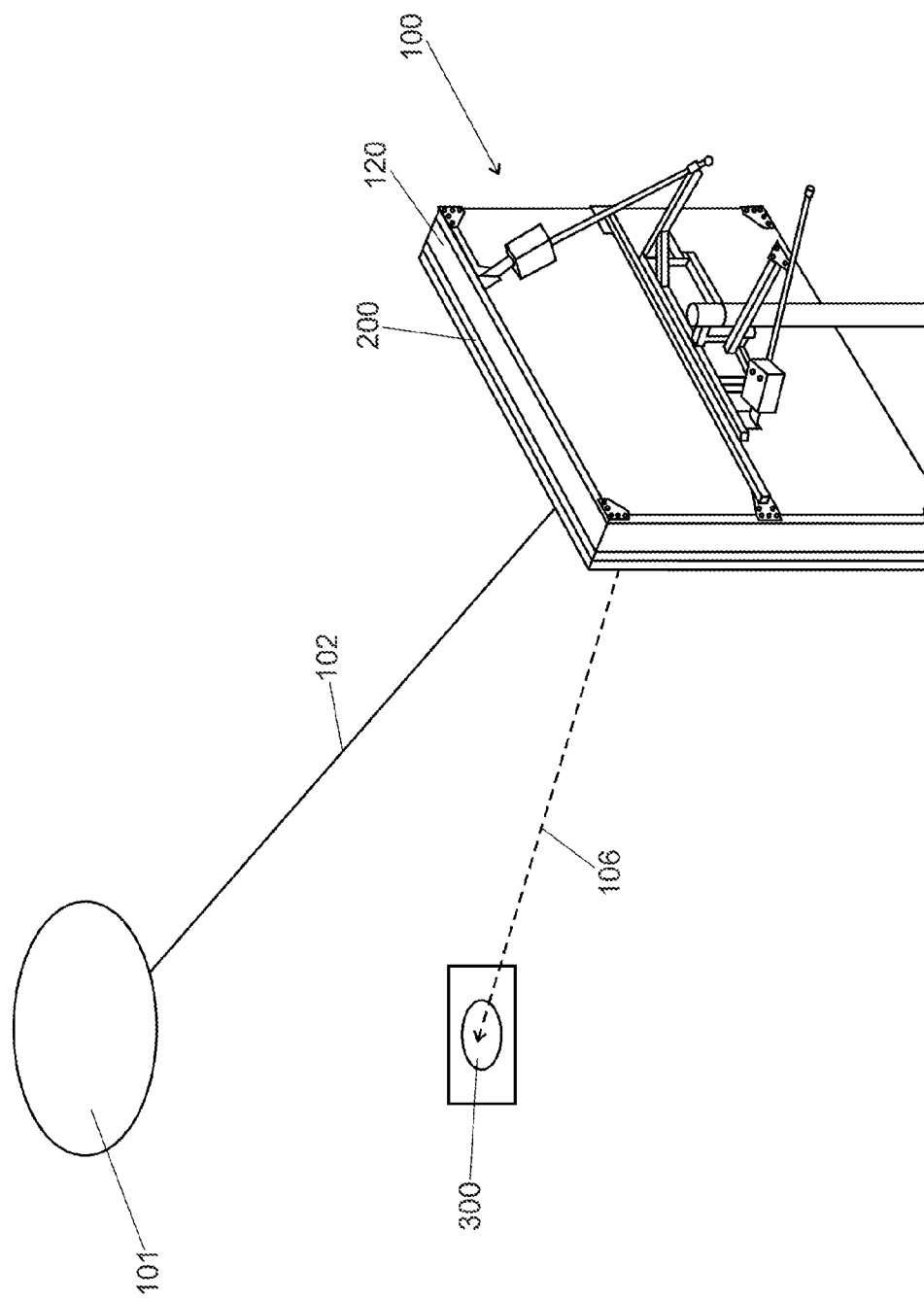
FIG. 2 is a perspective view of a deforming system according to an exemplary embodiment.

The present disclosure pertains to a rigid deformable reflector 200, a deforming system 100 capable of deforming a rigid deformable reflector 200, and methods of manufacturing a rigid deformable reflector 200. In one embodiment, the rigid deformable reflector 200 can be incorporated into a heliostat, a parabolic microphone, parabolic microwave system, or the like. In one embodiment, the rigid deformable reflector 200 can be incorporated into a solar furnace or heliostat as shown in FIGS. 1 & 2, for reflecting radiant solar energy 102 from a radiant energy source 101, such as the sun, onto a target 300 by way of a reflective surface 210 thereby increasing the temperature of the target 300. In one embodiment, the temperature of the target 300 is increased for purposes of manufacturing product, for example, without limitation, plastic products, or the like. The use of radiant solar energy 102 reduces or eliminates the need for electricity or fossil fuel heat sources such as natural gas to heat the target 300. The use of radiant solar energy 102 can be the sole energy source used to increase the temperature of the target 300 or can be used in combination with traditional energy sources such as electrical heating coils.

Figure 3:
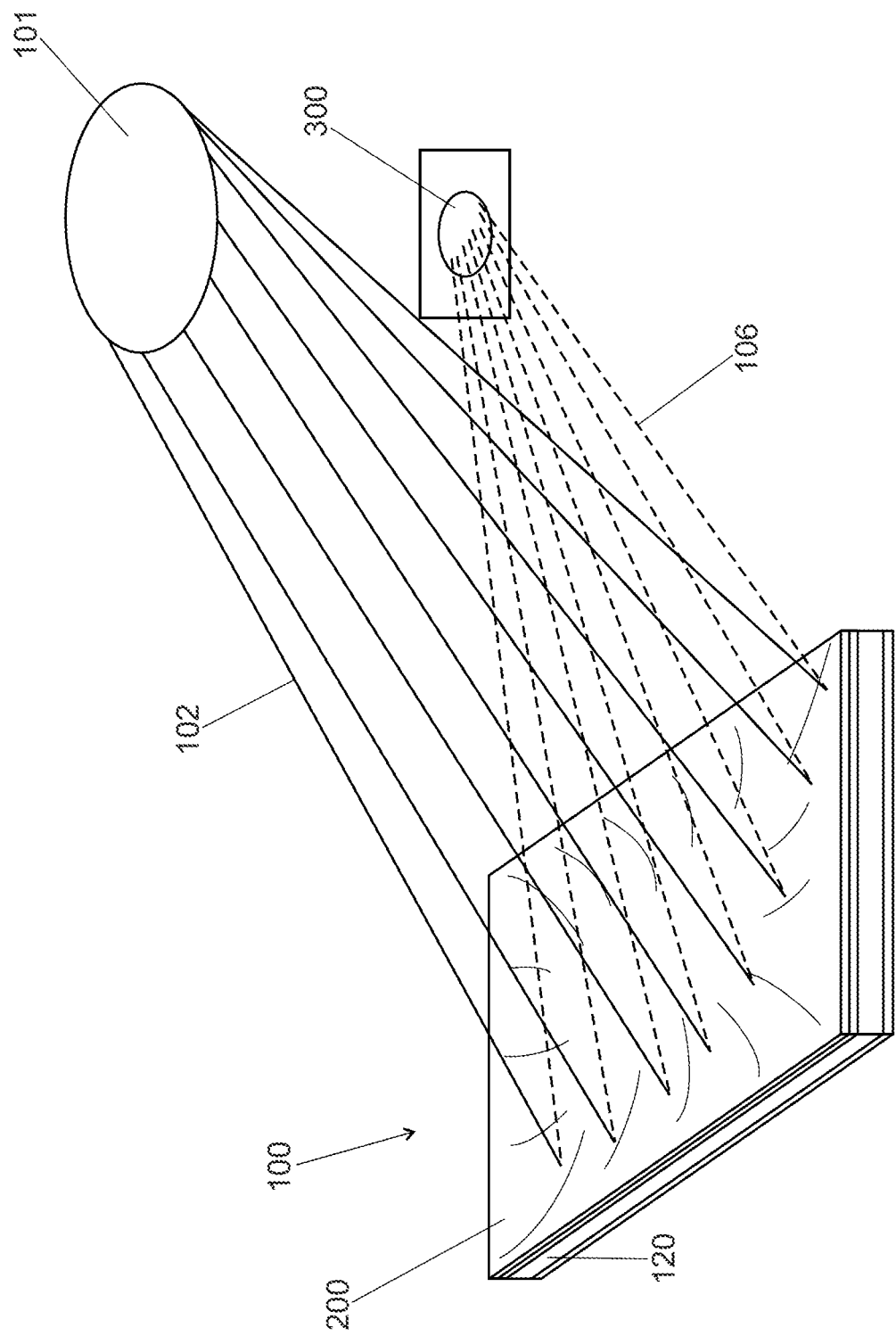
FIG. 3 is a perspective view of a deforming system according to an exemplary embodiment.

In one embodiment, as shown in FIGS. 2 & 3, the deforming system 100 can have at least one heliostat 200 and a target 300. The target 300 can be any object in which reflected radiant energy 106 is impinged upon for the purpose of increasing the temperature of the object. For example, the target 300 can be a blow molding mechanism, injection molding mechanism, rotational molding mechanism, a food processing system such as a coffee bean roaster, a boiler for generating steam, a heat storage system containing meltable compounds such as salts or other heat storage medium, an evaporator such as a maple syrup evaporator, a water tank mold, or the like. For example, where the target 300 is a blow molding mechanism, the rigid deformable reflector 200 reflects radiant energy 106 toward the extruder of the blow molding mechanism, thereby causing the reflected radiant energy 106 to impinge upon the extruder. The temperature of the extruder increases causing the medium, such as plastic, inside the extruder to melt, thereby allowing the plastic to be blow molded to a desired shape.

Figure 4:
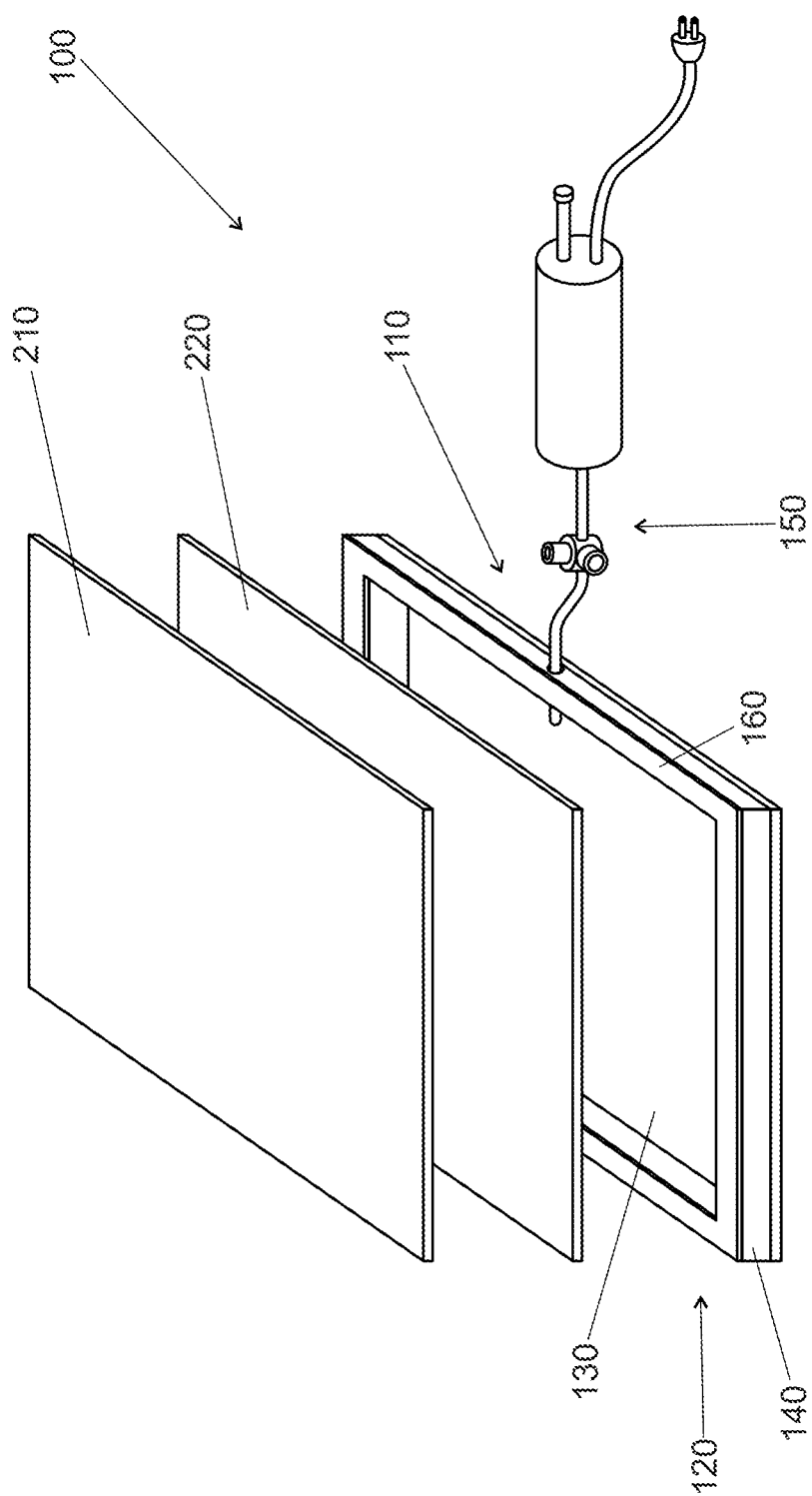
FIG. 4 is a perspective view of a deforming system according to an exemplary embodiment.
Figure 5:
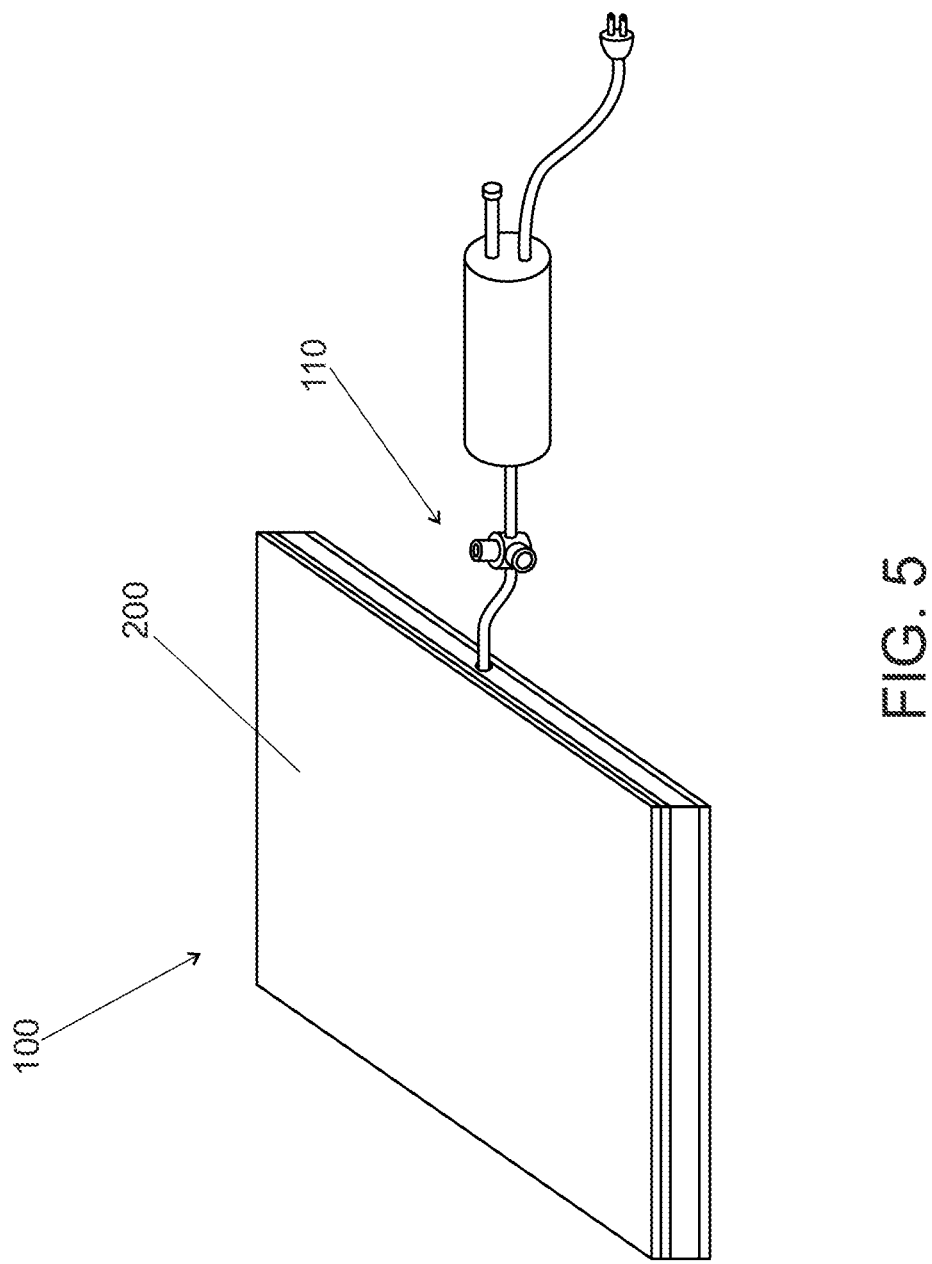
FIG. 5 is a perspective view of a deforming system according to an exemplary embodiment.
Figure 6:
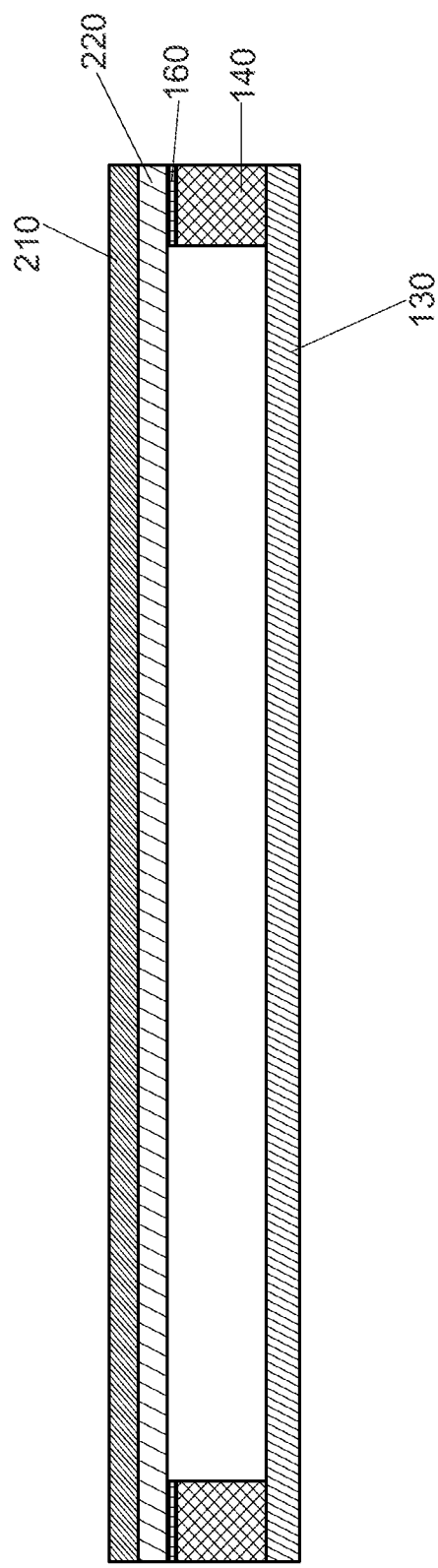
FIG. 6 is a side view of a deforming system according to an exemplary embodiment.

As shown in FIG. 4, the rigid deformable reflector 200 can have a reflective surface 210 and a backing surface 220. A reflective surface 210 can be applied to the exterior surface of the backing surface 220. A reflective surface 210 is any surface capable of reflecting radiant energy, such as electromagnetic radiation, radio waves, microwaves, infrared radiation, visible light, ultraviolet radiation, x-rays, gamma rays, or the like, and mechanical waves, such as sound waves, or the like. The reflective surface 210 can be a coating or thin film, for example, without limitation, reflector, polished surface, plastic sheet, membrane, or the like, and can be made of metal, glass, plastic, laminate, vinyl, biaxially-oriented polyethylene terephthalate, the like, or any combination thereof. In one embodiment, the reflective surface 210 can have a layered composite where a first layer is made of material having a reflective finish, a second layer is made of an aluminum-plastic material, and a third layer is made of a non-reflective aluminum material. In one embodiment, radiant solar energy 102 impinges on the reflective surface 210 whereby a first portion, or reflected radiant energy 106, of the radiant solar energy 102 is reflected off of the reflective surface 210, and a second portion of the radiant solar 102 energy is absorbed by the reflective surface 210.

The backing surface 220 is capable of providing support thereby allowing for the rigid deformable reflector 200 and/or the exterior surface of the rigid deformable reflector 200 to resist or withstand defects, for example, without limitation, deforming, bending, rippling, rattling, vibrating, or the like, due to forces caused by wind, knocking, bumping, dropping, forces resulting from a change in location of the rigid deformable reflector 200, forces resulting from a change in orientation of the rigid deformable reflector 200, inadvertent forces, or the like. In one embodiment, the backing surface 220 is a sheet of metal, aluminum, plastic composite, fiberglass, the like, or any combination thereof, having a substantially similar size and shape to the reflective surface 210. The material of the backing surface 220 has an elastic limit thereby allowing for the backing surface 220 to be deformed to a rigid shape or a shape that will maintain a desirable shape, i.e. concave, convex, or the like, after the material has been deformed.

The reflective surface 210 can engage the backing surface 220 by any conventional means of engaging a reflective surface 210 to a backing surface 220, for example, without limitation, gluing, lamination, or the like.

The deforming system 100 can have a backing surface 220 and a deforming mechanism 110 where the deforming mechanism 110 is capable of deforming a backing surface 220 or a rigid deformable reflector 200. Throughout this disclosure, a backing surface 220 is used when describing the deforming system 100 and methods of manufacturing a rigid deformable reflector 200. This in no way is meant to limit the disclosure to a backing surface 220, but rather for exemplar purposes, as other components, for example, without limitation, a rigid deformable reflector 200, reflective surface 220, or the like, could be used for like purposes.

The deforming mechanism 110 can deform a backing surface 220 or portion of the backing surface 220 into a variety of shapes, for example, without limitation, concave shape capable of providing a focal point, such as a three dimensional catenary shape or paraboloid, convex shape, or the like. A concave shape can focus or concentrate the reflected radiant energy onto a target, thereby increasing the amount of reflected radiant energy impinging upon a target area or a portion of a target. A concave shape alters the focus, and thus the focal length, of the reflected radiant energy thereby allowing for the reflected radiant energy to be isolated to a target area, where the target area can have different sizes and be located at different distances from the reflecting surface. In one embodiment, a convex shape can disperse the reflected radiant energy away from the target area, thereby reducing the amount of reflected radiant energy impinging the target area.

As shown in FIG. 2, the deforming mechanism 110 can have a base 120 having a bottom 130 and a frame 140, and an actuator 150. The bottom 130 can have any shape, for example, without limitation, round, square, rectangular, hexagonal, or the like. The frame 140 can extend from the interior surface of the bottom 130, thereby defining a cavity. In one embodiment, the frame 140 extends from the periphery of the interior surface of the bottom 130. The bottom 130 and frame 140 can be made of any material capable of supporting the backing surface 220 while a force is applied to the backing surface 220, for example, without limitation, wood, metal, or the like.

The backing surface 220 can have any shape, for example, without limitation, round, square, rectangular, hexagonal, or the like. In one embodiment, the backing surface 220 has a shape corresponding or substantially similar to the shape of the base 120. In one embodiment, the shape of the backing surface 220 is substantially similar to the shape outlined by the frame 140. For example, without limitation, where the shape created by the outline of the frame 140 is a square, the shape of the backing surface 220 is a square. The interior surface of the backing surface 220 can touch the top surface of the frame 140 thereby enclosing the cavity and creating a chamber. In one embodiment, the periphery of the interior surface of the backing surface 220 touches the top surface of the frame 140. The chamber can be sealed allowing for the chamber to be pressurized.

In one embodiment, the deforming mechanism 110 can have a gasket 160 capable of creating an air tight seal between the backing surface 220 and the base 120. The bottom surface of the gasket 160 can engage the base 120. In one embodiment, the bottom surface of the gasket 160 engages the top surface of the frame 140. The top surface of the gasket 160 can engage the interior surface of the backing surface 220. In one embodiment, the gasket 160 is capable of being deformed to allow for a change in shape of the backing surface 220 while still maintaining an air tight seal between the backing surface 220 and the base 120. In one embodiment, the ability of the gasket 160 to be deformed increases the area of the deformed portion of the rigid deformable reflector 200 used to focus or concentrate reflected radiant energy 106 toward a target and thus increases the amount of reflected radiant energy 106 impinging on the target 300. As shown in FIGS. 5-10, the gasket 160 can be capable of being deformed into a tapered cross-sectional shape upon the deforming mechanism 110 deforming the shape of the backing surface 220. In one embodiment, where the backing surface is deformed to a concave shape, the deformed gasket 160 can taper from the exterior periphery of the gasket 160 to the interior surface of the gasket 160. For example, without limitation, the thickness of the gasket 160, that is the distance from the top surface of the gasket 160 to the bottom surface of the gasket 160, decreases from the exterior surface of the gasket 160 to the interior surface of the gasket 160. In one embodiment, where the backing surface 220 is deformed to a convex shape, the deformed gasket 160 can taper from the interior of the gasket 160 to the exterior periphery of the gasket 160. For example, without limitation, the thickness of the gasket 160, that is the distance from the top surface of the gasket 160 to the bottom surface of the gasket 160, increases from the exterior surface of the gasket 160 to the interior surface of the gasket 160. The tapered shape of the gasket 160 allows for the gasket 160 to conform to the deformed shape of the reflective surface backing 220 thereby causing a more resilient seal between the reflective surface backing 220 and the gasket 160. The gasket 160 can be made of any suitable material that allows for the shape of the gasket 160 to deform, for example, without limitation, silicone rubber foam, flexible rubber compounds, or the like.

Figure 11:
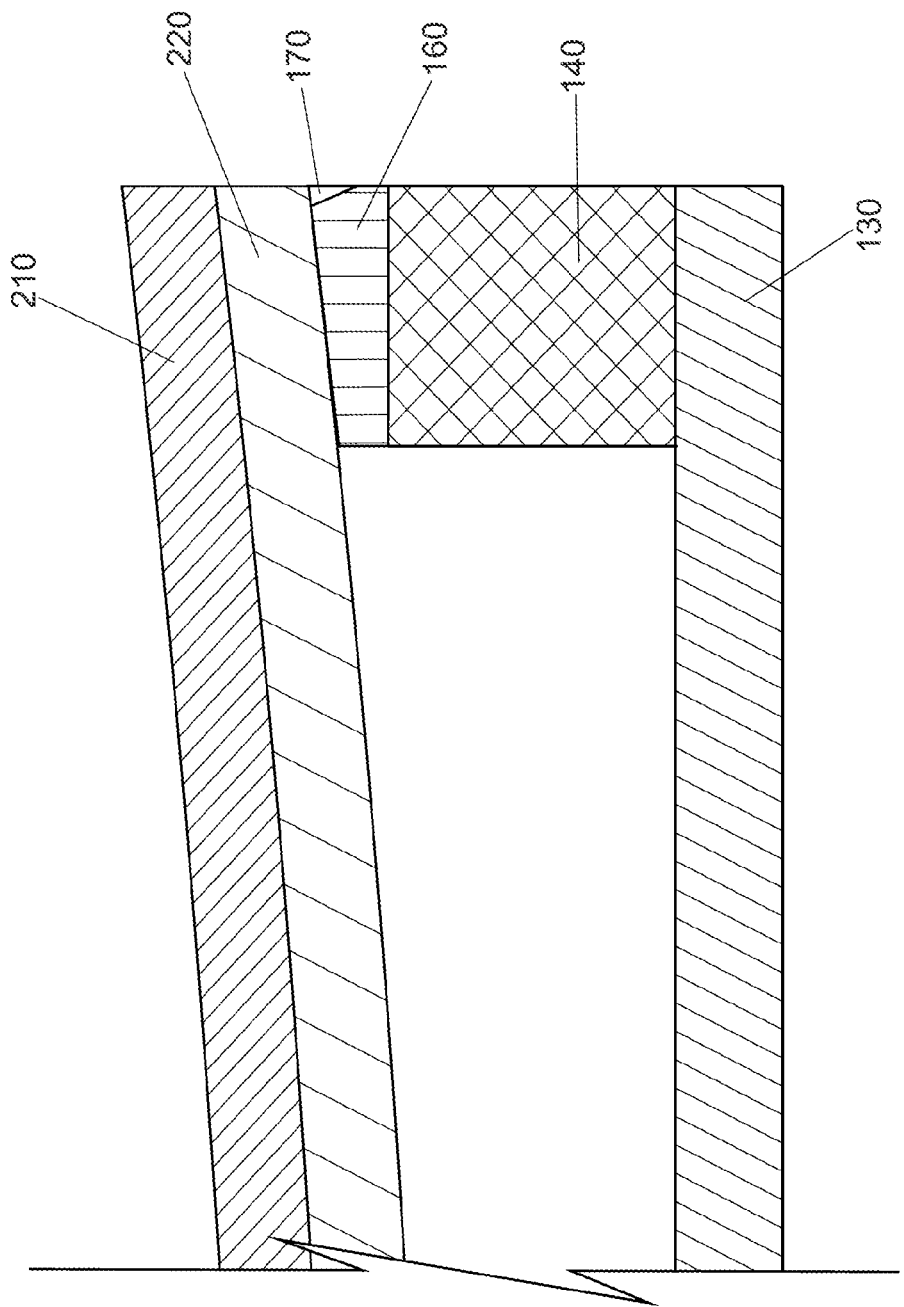
FIG. 11 is a side view of a deforming system according to an exemplary embodiment.

In one embodiment, as shown in FIG. 11, the deforming mechanism 110 can have a sealing material 170 capable of sealing the chamber, i.e. capable of preventing air from passing between the interior of the chamber and the exterior of the chamber. In one embodiment, the sealing material 170 prevents air from passing between the components of the deforming mechanism 110, for example, without limitation, between the frame 140 and the bottom 130, the frame 140 and the backing surface 220, the frame 140 and the gasket 160, the backing surface 220 and the gasket 160, or the like. In one embodiment, the sealing material 170 prevents air from passing from the interior of the chamber to the exterior of the chamber. In one embodiment, the sealing material 170 prevents air from passing from the exterior of the chamber to the interior of the chamber.

In one embodiment, the sealing material 170 is capable of engaging at least one component of the deforming mechanism 110 with at least one other component of the deforming mechanism 110. For example, the sealing material 170 is capable of engaging the frame 140 with the backing surface 220, the frame 140 with the gasket 160, the backing surface 220 with the gasket 160, or the like.

Figure 7:
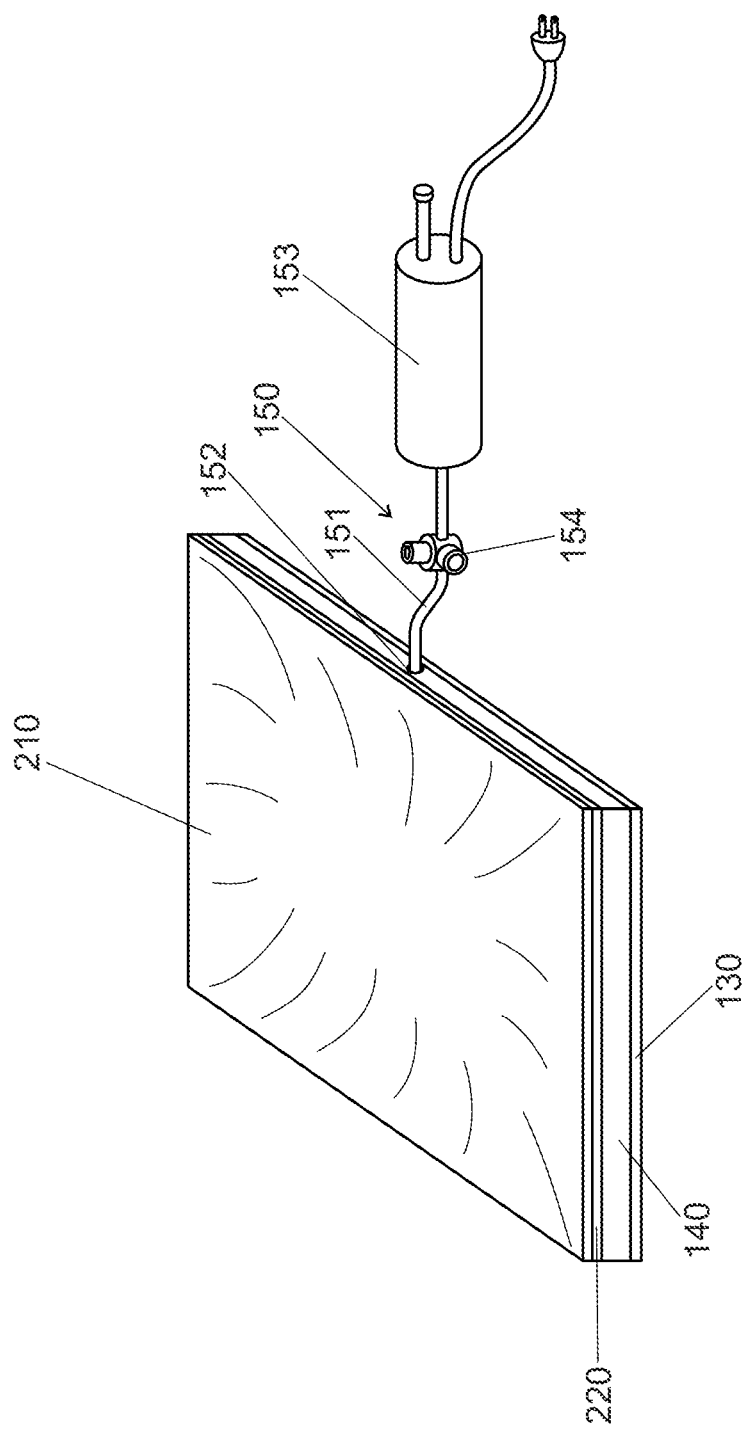
FIG. 7 is a perspective view of a deforming system according to an exemplary embodiment.
Figure 9:
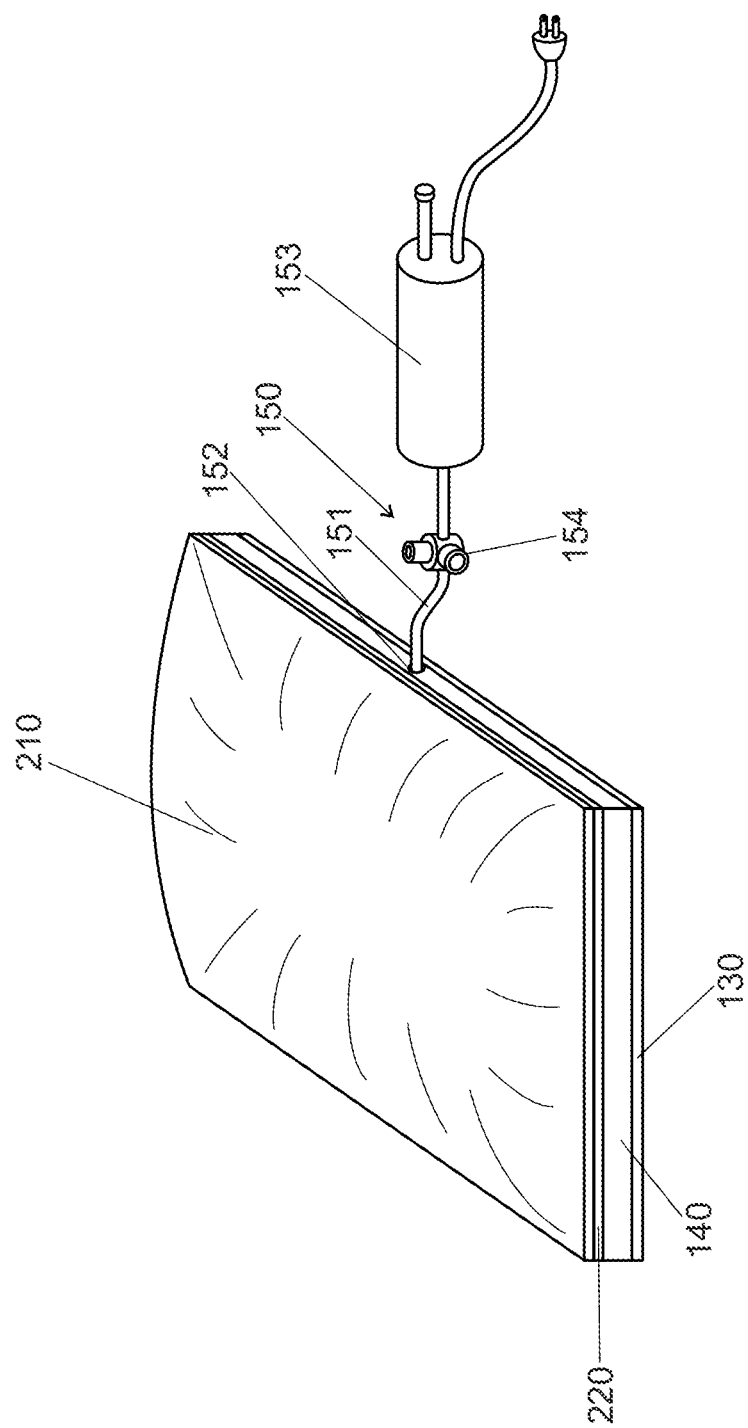
FIG. 9 is a perspective view of a deforming system according to an exemplary embodiment.

The sealing material 170 can be any material that has a low coefficient of expansion, for example, without limitation, silicone, or the like. The sealing material 170 can be applied to at least one joint of the deforming mechanism 110, for example, without limitation, the joint between the frame 140 and the backing surface 220, the frame 140 with the gasket 160, the backing surface 220 with the gasket 160, or the like The actuator 150 is capable of applying a force to the backing surface 220. The actuator 150 can be any mechanism capable of applying a deforming force to the backing surface 220, for example, without limitation, a hydraulic actuator, pneumatic actuator, electric actuator, mechanical actuator, or the like. Where the actuator 150 is a hydraulic actuator or pneumatic actuator, the actuator 150 can have a passageway 151, inlet 152, and pressure source 153, as shown in FIGS. 7 & 9. The inlet 152 is an opening capable of receiving an end of the passageway 151. The inlet 152 can be positioned in the base 120, for example, without limitation, the inlet 152 can be positioned within the frame 140. The passageway 151 can engage the pressure source 153 at the first end of the passageway 151 and can engage the base 120 at the second end of the passageway 151. Pressure medium is located inside the pressure source 153, passageway 151, and chamber. The pressure medium transfers the force applied by the pressure source 153 to the backing surface 220. The pressure medium can be any material capable of transferring a force, for example, without limitation, air, liquid, or the like.

Figure 12:
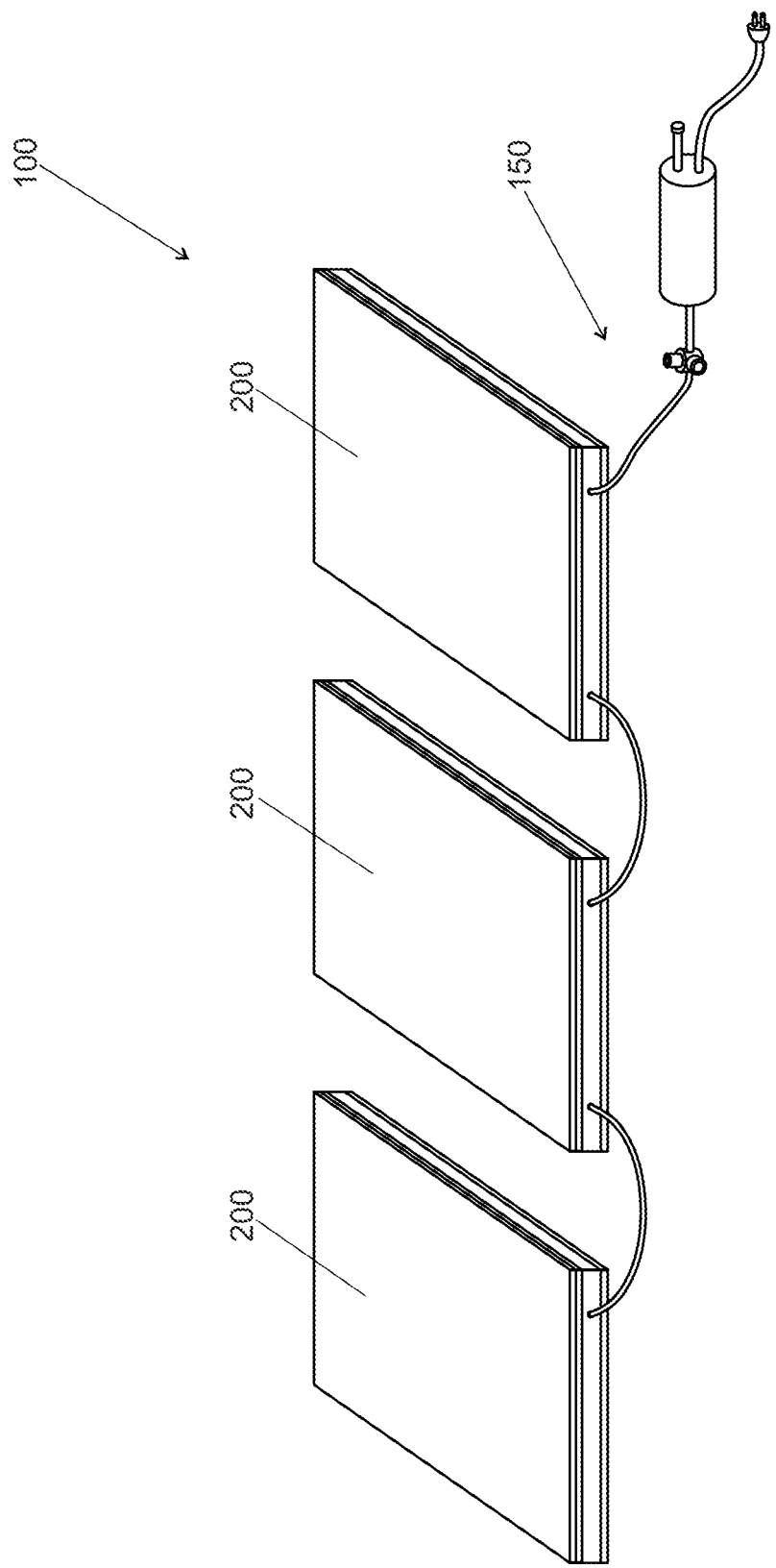
FIG. 12 is a perspective view of a deforming system according to an exemplary embodiment.

The actuator 150 can remain activated after the deforming force has deformed the backing surface 220 thereby providing further rigidity to the rigid deformable reflector 200 or the actuator 150 can be deactivated after the deforming force has deformed the backing surface 220. The actuator 150 can be deactivated to prevent or reduce natural changes in the atmospheric pressure from increasing or reducing the deforming force applied to the backing surface 220 due to the fact that the chamber and actuator are sealed. In one embodiment, the actuator 150 has a pressure release valve 154 for deactivating the actuator 150. The pressure release valve 154 can deactivate the actuator by venting or releasing pressure medium from the actuator 150 into the surrounding atmosphere. This release allows for the pressure to equalize between the surrounding atmosphere and the chamber thereby reducing the deforming force applied to the backing surface 220. In one embodiment, the actuator 150 is capable of deforming a plurality of backing surfaces 220. In one embodiment, as shown in FIGS. 12 & 13, the actuator 150 engages a plurality of bases 120 thereby allowing for the actuator 150 to deform a plurality of backing surfaces 220.

Figure 8:
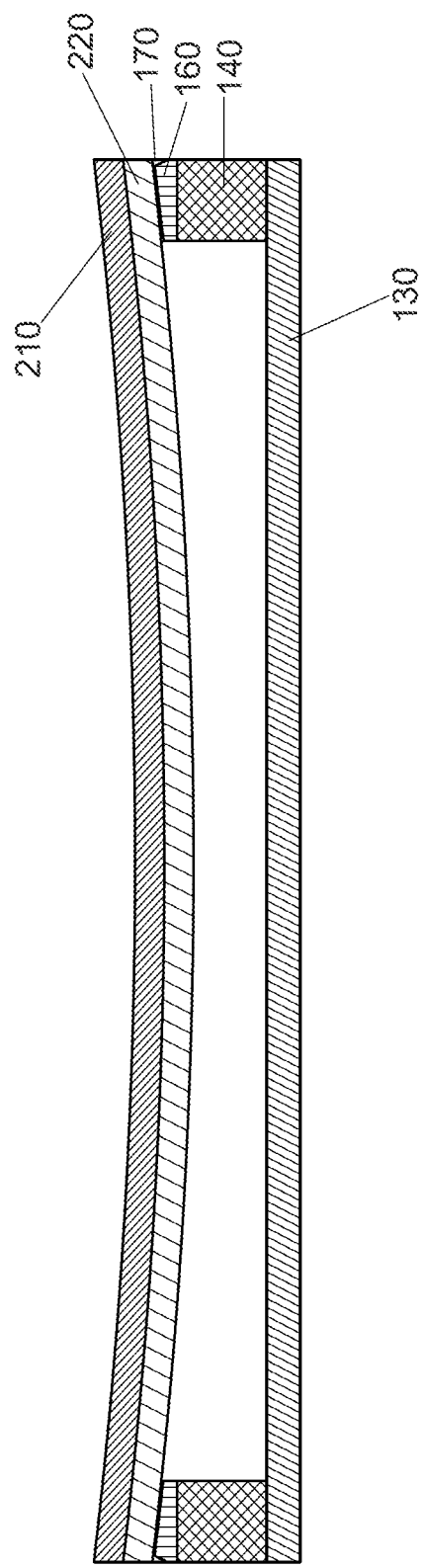
FIG. 8 is a side view of a deforming system according to an exemplary embodiment.
Figure 10:
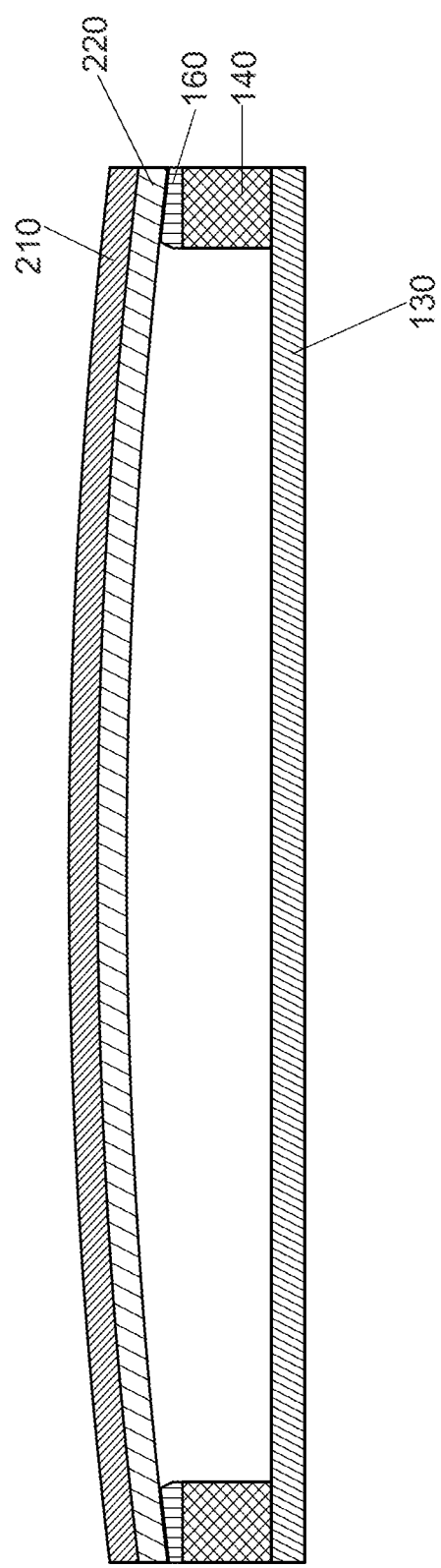
FIG. 10 is a side view of a deforming system according to an exemplary embodiment.

In one embodiment, the force applied to the backing surface 220 by the actuator 150 can be a negative force, i.e. a force that drafts the backing surface 220 toward the base 120 of the deforming mechanism 110. As shown in FIGS. 7 & 8, the negative force results in a concave shape of the backing surface 220 where the substantially center portion of the backing surface 220 is drafted towards the base 120 while the periphery of the backing surface 220 remains engaged to the frame 140. In one embodiment, where the force is applied by a hydraulic actuator or pneumatic actuator, the force applied to the backing surface 220 is constant at every point to which the pressure medium touches the backing surface 220. In one embodiment, where the force is constant at every point on the backing surface, the rigid deformable reflector 200 has a concave shape, for example, concave shape capable of providing a focal point, such as a three dimensional catenary shape or paraboloid, or the like shape. In one embodiment, the force applied to the backing surface 220 by the actuator 150 can be a positive force, i.e. a force that drives the backing surface 220 away from the base 120 of the deforming mechanism 110. In one embodiment, as shown in FIGS. 9 & 10, the positive force results in a convex shape of the reflective surface 210 where the substantially center portion of the backing surface 220 is driven away from the base 120 while the periphery of the backing surface 220 remains engaged to the frame 140.

In one embodiment, the force applied to the backing surface 220 deforms the reflective surface 210 beyond the elastic limit or yield strength of the backing surface 220 causing the backing surface 220 to maintain the deformed shape. For example, without limitation, where the force applied to the backing surface 220 is a negative force, the backing surface 220 is drafted into a concave shape beyond the elastic limit of the backing surface 220, thereby causing the backing surface 220 to maintain the concave shape. By way of another example, without limitation, where the force applied to the backing surface 220 is a positive force, the backing surface 220 is driven into a convex shape beyond the elastic limit of the backing surface 220, thereby causing the backing surface 220 to maintain the convex shape. By applying a force that deforms the backing surface 220 beyond the elastic limit, the resulting shape, for example, without limitation, concave, convex, or the like, of the deformed backing surface 220 is rigid. In one embodiment, the rigidity of the deformed backing surface 220 prevents or reduces the effects on the deformed backing surface 220, reflective surface 210, and/or exterior surface of the reflective surface from deforming, bending, rippling, rattling, or vibrating due to forces caused by wind, knocking, bumping, dropping, forces resulting from a change in location of the rigid deformable reflector 200, forces resulting from a change in orientation of the rigid deformable reflector 200, inadvertent forces, or the like.

Where the resulting shape of the deformed backing surface 220 is undesirable, the actuator 150 can be activated to apply a second deforming force to the rigid deformable reflector 200 in the opposite direction as the first deforming force, thereby deforming the shape of the rigid deformable reflector 200. For example, where the deformed reflective surface 210 has a concavity deeper than the desired depth, the actuator 150 can be activated to drive the backing surface 220 away from the base 120 thereby resulting in a backing surface 220 with a shallower concavity than the previous deformed shape of the backing surface 220.

The following, by way of example, describes a method of manufacturing a rigid deformable reflector 200 utilizing a base 120 having a gasket 160 and sealing material 170. The reflective surface 210 can be engaged to the backing surface 220 at any point during the manufacturing process including prior to engaging the backing surface 220 to the base 120, after the deforming force has been applied to the backing surface 220, after the deforming force has been removed from the backing surface 220, or the like. The backing surface 220 is placed onto the gasket 160. In one embodiment, sealing material 170 is added between the backing surface 220 and the gasket 160. The actuator 150 is activated thereby causing a deforming force to be applied to the backing surface 220. In one embodiment, the backing surface 220 is drafted towards the base 120 beyond the elastic limit of the backing surface 220 thereby causing the backing surface 220 to be rigidly deformed to a concave shape. In one embodiment, the actuator 150 is deactivated thereby releasing the deforming force applied to the backing surface 220. In one embodiment, the actuator 150 is reactivated thereby causing the backing surface 220 to be driven away from the base 120 to obtain a shallower concave shape of the deformed backing surface 220. In one embodiment, the reflective surface 210 is engaged to the deformed backing surface 220 forming a rigid deformable reflector 200. In one embodiment, the deformed backing surface 220 is disengaged from the deforming mechanism 110. The rigid deformable reflector 200 and deforming mechanism 110 are incorporated onto a heliostat.

The following, by way of example, describes another method of manufacturing a rigid deformable reflector 200 utilizing a base 120 having a gasket 160 and sealing material 170. The backing surface 220 is placed onto the gasket 160. A sealing force is applied to the backing surface 220 thereby creating a seal between the backing surface 220 and the gasket 160. The actuator 150 is activated thereby causing a deforming force to be applied to the backing surface 220. In one embodiment, the backing surface 220 is driven away from the base 120 beyond the elastic limit of the backing surface 220 thereby causing the backing surface 220 to be rigidly deformed to a convex shape. The sealing force is removed from the backing surface 220. In one embodiment, the actuator 150 is deactivated thereby releasing the deforming force applied to the backing surface 220. In one embodiment, the reflective surface 210 is engaged to the deformed backing surface 220 forming a rigid deformable reflector 200. In one embodiment, the reflective surface 210 is engaged to the backing surface 220 prior to engaging the backing surface 220 to the base 120. In one embodiment, the deformed backing surface 220 is disengaged from the base 120. The rigid deformable reflector 200 is incorporated onto a heliostat.

The following, by way of example, describes another method of manufacturing a rigid deformable reflector 200 utilizing a base 120 having a gasket 160 and sealing material 170. The backing surface 220 is placed onto the gasket 160. In one embodiment, sealing material 170 is added between the backing surface 220 and the gasket 160. The actuator 150 is activated thereby causing a deforming force to be applied to the backing surface 220. In one embodiment, the backing surface 220 is drafted towards the base 120 beyond the elastic limit of the backing surface 220 thereby causing the backing surface 220 to be rigidly deformed to a concave shape. In one embodiment, the reflective surface 210 is engaged to the deformed backing surface 220 forming a rigid deformable reflector 200. The rigid deformable reflector 200 and deforming mechanism 110 are incorporated onto a heliostat.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A reflector deforming system for deforming a rigid deformable reflector comprising:
   a rigid deformable reflector comprising a reflective surface and a backing surface comprising an interior surface, wherein the rigid deformable reflector is capable of being rigidly deformed beyond its elastic limit and capable of heating a mold, and
   a deforming mechanism capable of deforming the backing surface, the deforming mechanism comprising
   a gasket comprising a top surface and a bottom surface,
   a base comprising a frame comprising a top surface, and
   an actuator,
   wherein the base engages the backing surface, the engagement of the base with the backing surface defines a chamber, the actuator is capable of applying a force to the rigid deformable reflector, the bottom surface of the gasket engages the top surface of the frame, the top surface of the gasket engages the interior surface of the backing surface, and the gasket is capable of creating an air tight seal between the backing surface and the base.

2. The reflector deforming system of claim 1 wherein the deforming mechanism further comprises a sealing material capable of preventing air from passing between the interior or the chamber and the exterior of the chamber.

3. The reflector deforming system of claim 1 wherein the actuator is a pneumatic actuator.

4. The reflector deforming system of claim 1 wherein the actuator has a passageway, inlet, pressure source, and pressure medium.

5. The reflector deforming system of claim 4 wherein the actuator further comprises a pressure release valve.

6. The reflector deforming system of claim 1 wherein the deforming mechanism is capable of deforming the backing surface to a convex shape.

7. The reflector deforming system of claim 1 wherein the deforming mechanism is capable of deforming the backing surface to a concave shape.

8. The rigid deformable reflector of claim 7 wherein the concave shape is capable of providing a focal point.

9. A method of deforming a rigid deformable reflector utilizing the reflective deforming system of claim 1
   the method comprising the steps of:
   placing the rigid deformable reflector onto the deforming mechanism, and activating the actuator thereby causing a first force to be applied to the rigid deformable reflector and deforming the shape of the rigid deformable reflector beyond its elastic limit.

10. The method of claim 9 wherein the deformed shape of the rigid deformable reflector is a convex shape.

11. The method of claim 9 wherein the deformed shape of the rigid deformable reflector is a concave shape.

12. The method of claim 11 wherein the concave shape is capable of providing a focal point.

13. The method of claim 9 further comprising the step of deactivating the actuator.

14. The method of claim 9 wherein said deforming mechanism further comprises a pressure release valve, the method further comprising the step of opening the pressure release valve.

15. The method of claim 9 further comprising the step of actuating the actuator thereby causing a second deforming force to be applied to the rigid deformable reflector in the opposite direction as the first deforming force, thereby deforming the shape of the rigid deformable reflector.

16. The rigid deformable reflector of claim 1 wherein the mold is selected from the group consisting of a blow molding mechanism, injection molding mechanism, and rotational molding mechanism.

17. The reflector deforming system of claim 1 wherein the rigid deformable reflector further comprises a perimeter, the perimeter of the rigid deformable reflector engages the gasket, the deforming mechanism deforms the rigid deformable reflector to a concave shape, and the gasket allows for the perimeter to be shaped to form a portion of the concave shape.

18. The reflector deforming system of claim 1 wherein the gasket is deformable.

19. The reflector deforming system of claim 18 wherein the gasket deforms upwardly and downwardly.

20. The rigid deformable reflector of claim 1 wherein the rigid deformable reflector is capable of withstanding defects.

21. The rigid deformable reflector of claim 1 wherein the reflective surface comprises a layered composite.

22. The rigid deformable reflector of claim 1 wherein the backing surface is capable of supporting the reflective surface and the backing surface engages the reflective surface.

* * * * *